(12) United States Patent
Tönnigs

(10) Patent No.: US 8,070,897 B2
(45) Date of Patent: Dec. 6, 2011

(54) CASE CLAMP

(75) Inventor: Bodo Tönnigs, Lichtenberg (DE)

(73) Assignee: Ligmatech Automationssysteme GmbH, Lichtenberg (DE)

( * ) Notice: Subject to any disclaimer, the term of this patent is extended or adjusted under 35 U.S.C. 154(b) by 1275 days.

(21) Appl. No.: 11/783,374

(22) Filed: Apr. 9, 2007

(65) Prior Publication Data

US 2007/0262505 A1 Nov. 15, 2007

(30) Foreign Application Priority Data

May 10, 2006 (EP) ..................................... 06009645

(51) Int. Cl.
*B32B 37/00* (2006.01)
(52) U.S. Cl. ..................................... 156/73.1; 156/580.1
(58) Field of Classification Search .................. 156/73.1, 156/580.1, 580.2; 264/442, 443, 445; 425/174.2
See application file for complete search history.

(56) References Cited

U.S. PATENT DOCUMENTS

| | | | |
|---|---|---|---|
| 3,639,001 A | * | 2/1972 | Anderson .................. 297/451.1 |
| 4,243,465 A | | 1/1981 | Gozzi |
| 6,913,666 B1 | * | 7/2005 | Aeschlimann et al. ...... 156/73.1 |

FOREIGN PATENT DOCUMENTS

| | | |
|---|---|---|
| EP | 1 046 482 | 10/2000 |
| EP | 1 046 482 A1 | 10/2000 |
| EP | 1 593 472 A1 | 11/2005 |
| WO | WO 98/42988 | 10/1998 |

* cited by examiner

*Primary Examiner* — James Sells
(74) *Attorney, Agent, or Firm* — Finnegan, Henderson, Farabow, Garrett & Dunner LLP

(57) ABSTRACT

The invention discloses a case clamp (20) for clamping of carcass parts into furniture carcasses, such as tall cupboards, top or bottom cupboards, having a base frame (1), at least one pair of compression beams (6, 7) provided on the base frame (1), whereby at least one compression beam is traversable along the base frame in relation to the other compression beam, and at least one feed device (5) for transporting in carcass parts to be clamped and/or for transporting out clamped carcasses. The case clamp according to the invention is characterized in that the case clamp (20) also has an ultrasonic welding device (15, 16, 17).

17 Claims, 2 Drawing Sheets

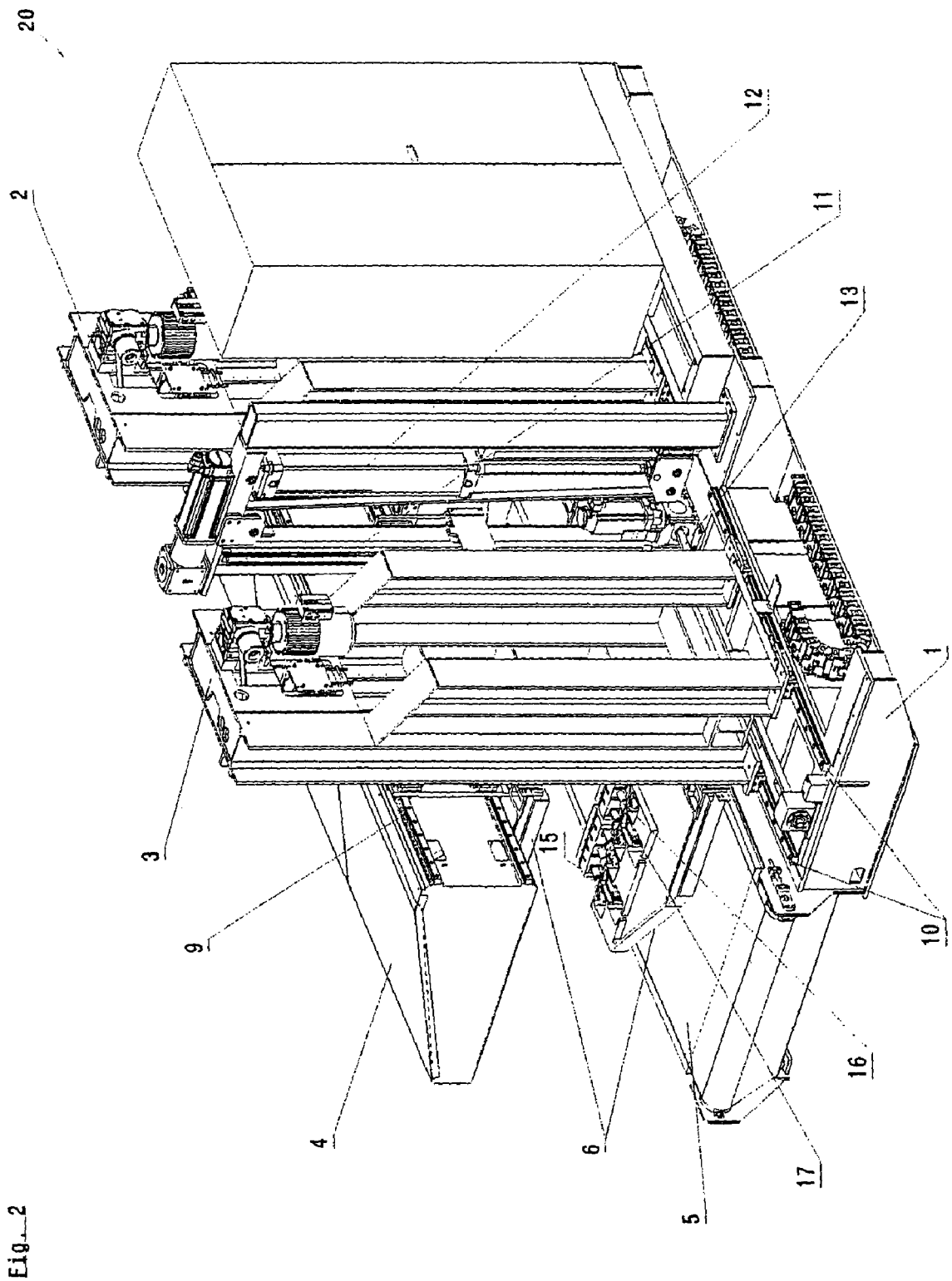
Fig_2

CASE CLAMP

FIELD OF THE INVENTION

The present invention relates to a case clamp in accordance with the preamble of claim 1.

PRIOR ART

Furniture carcasses are generally constructed from slab-shaped workpieces which are joined using dowels and glue and are subsequently clamped. Case clamps of the type referred to initially are widely used for this purpose.

A case clamp of the generic kind is disclosed for example in EP 1 046 482 A and has a torsion-resistant, upright support frame with a front and a rear, a pair of vertical compression beams with one upper and one lower compression beam, both of which project from the support frame at the front, whereby one of the compression beams is vertically adjustable by means of a drive and is supported on the support frame and the other compression beam is rigidly connected to the support frame. In addition, the known case clamp has a pair of horizontal compression beams with one right-hand and one left-hand compression beam, both of which project from the front of the support frame at least during compression, and both of which can be traversed on the support frame in the gap between the pair of vertical compression beams by means of horizontally traversable supports.

Generally a distinction is made between through-feed clamps and joining clamps. In through-feed clamps the carcasses to be clamped are first assembled completely (joined) and subsequently transported into the case clamp and clamped, whilst in joining clamps there are devices integrated in the clamp itself for joining the carcass or at least individual parts of the carcass, such as holding devices for false floors, etc.

Both clamp concepts have proven themselves in practical use. However, the use of glue (usually PVA) in the area of the dowel joints means that a considerable curing time must pass after clamping before the carcass can be processed further or packaged, etc. In addition, excess glue which escapes often has to be removed subsequently which is both time- and labour-intensive.

PRESENTATION OF THE INVENTION

The object of the present invention is, therefore, to provide a case clamp of the type referred to initially which enables accelerated and less labour-intensive manufacture of furniture carcasses.

This object is achieved according to the invention by a case clamp with the features of claim 1. Especially advantageous developments of the invention are indicated in the dependent claims.

The invention is based on the idea of being able to dispense completely with the use of glue in the area of the dowel joining points. To this end, according to the invention, the case clamp of the type referred to initially is additionally provided with an ultrasonic welding device. Instead of wooden dowels with glue, this will render it possible to use novel dowels as joining means, which can be at least partially melted by the application of mechanical vibrations (ultrasonic vibrations). In this case, for example, the dowels concerned may consist at least in part of a thermoplastic material.

Due to the embodiment according to the invention and the ability to dispense with the glue in the area of the dowel joints as a result thereof, the clamped carcasses may be routed to further processing or packaging operations, etc. almost immediately after the clamping process with the result that the throughput time of the carcasses is shortened dramatically and it is possible to dispense with any interim storage. Carcasses clamped in this manner also require no subsequent cleaning. At the same time, carcasses clamped in this manner meet at least the same strength and durability requirements as conventionally glued carcasses.

The ultrasonic welding device may be designed in different ways within the scope of the present invention. According to a development of the present invention, however, it is envisaged that the ultrasonic welding device has at least one sonotrode, i.e. a welding tool that must be brought into pressure contact with the workpieces to be joined. Although, within the scope of the present invention, the sonotrodes may be disposed at any point as independent elements, it is preferable with a view to a compact and simple structural design of the case clamp according to the invention for the at least one sonotrode to be disposed in at least one of the compression beams. In this regard it is especially preferable for at least one sonotrode in. each case to be disposed in each compression beam of at least one pair of compression beams, in particular of a pair of horizontal compression beams. This means that it is possible to generate the counterpressure necessary for each sonotrode by means of a sonotrode with an associated compression beam with the result that counterpressure elements and the like may be dispensed with.

According to a development of the invention, it is provided that the sonotrodes are disposed in the compression beams such that they form at least part of a pressure surface of the compression beams. The result hereof is an especially efficient and rapid ultrasonic welding process.

According to a further development of the invention, the ultrasonic welding device also comprises what is also known as a converter, i.e. a sonic transducer, which converts electrical vibrations produced by a generator into mechanical vibrations. In addition, the ultrasonic welding device also includes an amplitude transformation part (booster), which transforms the vibration delivered by the converter for the relevant sonotrode. Although these components may be disposed in principle at any point in the case clamp, it is envisaged according to a development of the present invention that the at least one compression beam provided with at least one sonotrode has a booster and also a converter for the sonotrode. The result hereof is a simple structural design which may be easily and accurately adapted to requirements in each case.

The basic construction of the case clamp may be designed in the most varied manner within the scope of the present invention. A case clamp construction which can clamp carcasses efficiently is specified in claim 6. In this regard, it is especially preferable for the supports of this construction to be supported in each case exclusively on the base frame in the vertical direction at least and to be free on the opposing end. In the case clamp according to the invention it is possible in this manner to dispense completely with upright support frames present in the prior art (cf. for example, EP 1 046 482 A), with the result that a large proportion of the bulky and heavy components of the known case clamps are dispensed with and the case clamp's construction is simplified enormously. Furthermore, loss of the support frame also considerably improves access to the case clamp and the case clamp advantageously requires significantly less space.

Supporting of the supports on the base frame may be achieved in a variety of ways within the scope of the present invention. According to a development of the invention, it is, however, envisaged to support each of the supports on the base frame by way of at least two guide elements to enable the dissipation of high compression forces with easy traversability of the supports. The guide elements concerned are preferably guide rails.

Within the scope of the present invention, the positioning drive for the upper compression beam of the case clamp construction referred to may be integrated, for example, in the supports. According to a development of the present invention, it is, however, envisaged that the case clamp also has a drive pillar for the upper compression beam which has a drive, in particular a servo-drive. This prevents the construction of the supports from being unduly complex without the overall design becoming noticeably more complicated. In addition, the high forces of the upper compression beam occurring during compression are dissipated directly into the base frame via the drive pillar.

In order to further relieve the pressure on the overall construction of the case clamp and on the drive in particular, it is envisaged according to a development of the invention that the case clamp also has a counterweight. As a result of this the drive need not continuously compensate the weight of the upper compression beam. In this regard, it is especially preferable for the counterweight to be integrated in the drive pillar so that the drive and the counterweight can co-operate directly. It has also proven advantageous for the counterweight to function pneumatically.

According to a further development of the invention, the case clamp also has at least one holding element for carcass parts to be joined. As a result this means that not all carcass parts necessarily have to be joined prior to transport into the case clamp but that individual or, if necessary, all carcass parts may be made ready and joined inside the case clamp. The case clamp's variability is increased tremendously in this manner. In this regard, it is especially preferable that at least one holding element is traversable in relation to the base frame to increase the variability still further. In addition, according to a development of the invention, the at least one holding element may also be used in order to provide at least one sonotrode and a booster and a converter therein. This results in an especially compact and versatile construction of the case clamp according to the invention with which the most varied geometries and arrangements of furniture carcasses can be joined and clamped.

Claim 13 specifies an especially advantageous process for the clamping of carcass parts using the case clamp described above. The advantages described above may be achieved in a simple manner using this process.

BRIEF DESCRIPTION OF THE DRAWINGS

FIG. 2 shows a diagram of a rear perspective view of the case clamp shown in FIG. 1.

DETAILED DESCRIPTION OF PREFERRED EMBODIMENTS

Figure 1:
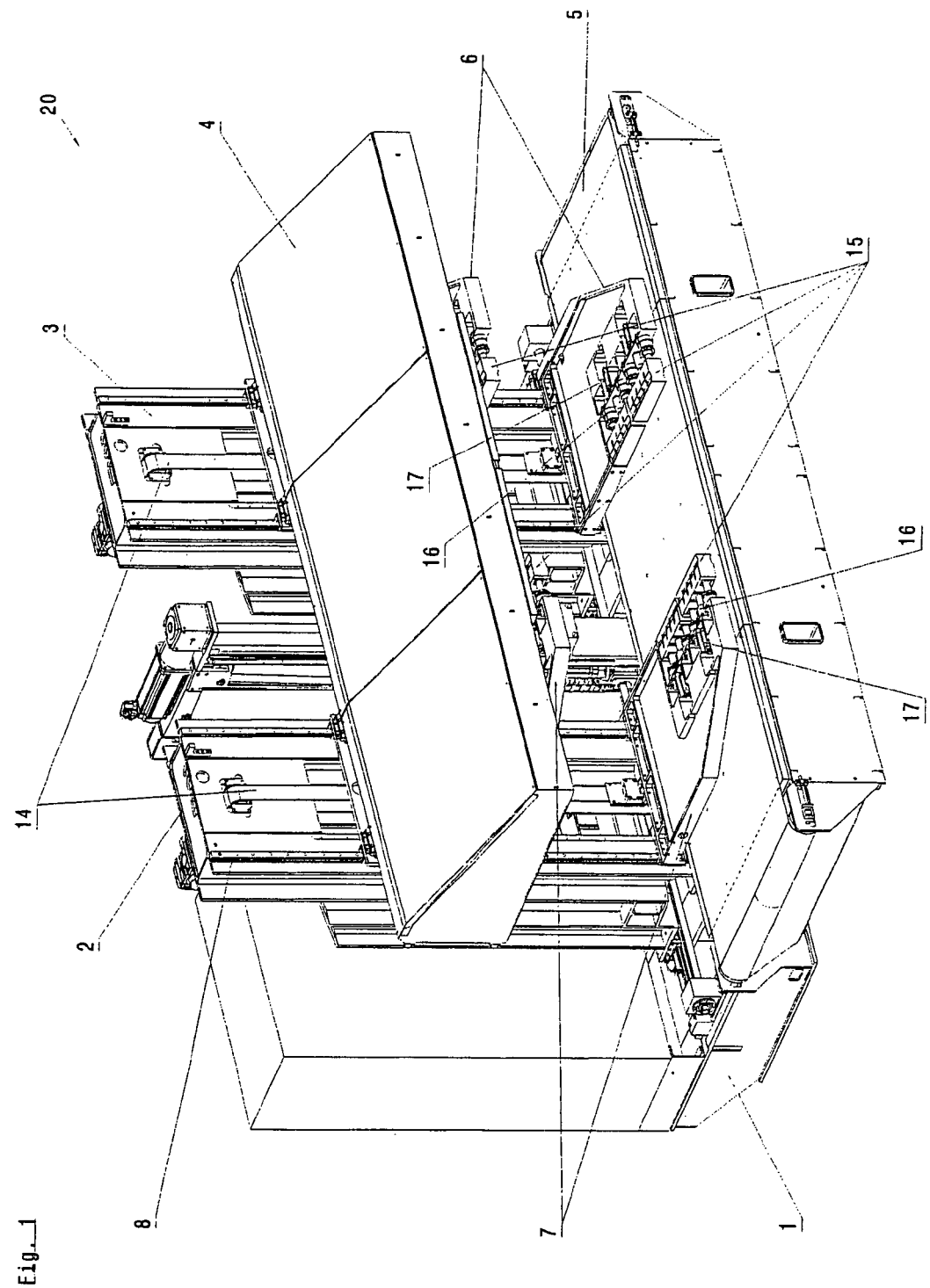
FIG. 1 shows a diagram in perspective view of a case clamp as a preferred embodiment of the present invention.

Preferred embodiments of the present invention will be described in detail in the following with reference to the accompanying drawings.

A case clamp 20 as a preferred embodiment of the present invention is shown schematically in FIGS. 1 and 2 in perspective views. Case clamp 20 serves to clamp carcass parts to furniture carcasses, such as, for example, tall cupboards, top or bottom cupboards, other items of furniture or the like.

Case clamp 20 has a base frame 1, which may for example consist of a welded steel structure. Provided laterally on base frame 1 is a lower compression beam, which in the present embodiment is integrated with a feed device 5 which will be explained in even greater detail below.

In addition, disposed on base frame 1 in the present embodiment are two supports 2, 3 which in the present embodiment are both horizontally traversable on base frame 1. The traversability of supports 2, 3 is achieved here by way of guide rails 10 in addition to two, servomotor-driven ball-and-screw spindles 13 working in opposite directions. As may be seen best in FIG. 2, guide rails 10 are located at a distance from each other so that the supports can transmit a bending moment and dissipate corresponding forces into the base frame around an axis parallel to guide rails 10.

The free end 2', 3' of the supports opposing guide rails 10 is free (unsupported) with the result that supports 2, 3 are supported exclusively on base frame 1 in the vertical direction at least.

Disposed in pairs on supports 2, 3 respectively are horizontal compression beams 6, 7, i.e. a horizontal compression beam 6 is matched in operation to opposing horizontal compression beam 7 in each case.

In the present embodiment, a sonotrode 15, a booster 16 and a converter 17 are provided in each of the horizontal compression beams, said elements representing the substantial components of the ultrasonic welding device according to the invention. This device also comprises an (electronic) generator (not shown), which generates electrical vibrations that are converted in turn into mechanical vibrations by converter 17. Said vibrations are passed by way of booster 16 to sonotrode 15 in order to transmit them finally in conjunction with the clamping process to dowels not shown in greater detail here. As the dowels consist at least in part of a thermoplastic material, they are melted by the ultrasonic vibrations in order to harden again subsequently and to ensure a joint between the relevant parts of the carcass.

Although the components of the ultrasonic welding device are provided in horizontal compression beams in the present embodiment, it should be noted that sonotrodes 15, boosters 16 and converters 17, etc. may also be disposed in compression beams or pairs of compression beams disposed very differently, such as vertical compression beams, corner compression beams, diagonal compression beams or the like. In this regard, it is always advantageous if sonotrodes 15 are disposed in each case such that they form a part of a pressure surface of compression beams 6, 7.

The traversability of horizontal compression beams 6, 7 along supports 2, 3 is achieved by way of a positioning device 14, in the form of a belt for example. Case clamp 20 also has an upper compression beam 4, which is supported by way of guide rails 8 so as to be vertically traversable on supports 2, 3. In addition, supports 2, 3 are also disposed so as to be horizontally traversable in relation to upper compression beam 4, that is to say by way of guide rails 9, which may best be seen in FIG. 2.

Within the scope of the present invention, horizontal and vertical are understood to be two directions which are orthogonal to each other. Thus the invention is not restricted such that the case clamp or its components must be exactly horizontally or vertically disposed, but rather that the directions referred to are orthogonal to each other.

Case clamp 20 also comprises a drive pillar 11 for upper compression beam 4, which in the present embodiment has a servo drive 11'. By means of this drive 11' it is possible to move upper compression beam 4 vertically along supports 2, 3. In this regard a counterweight 12 (pneumatic for example) is integrated into drive pillar 11 by means of which drive 11' is largely relieved of the own weight loads arising from the movements of upper compression beam 4.

Finally, case clamp 20 in the present embodiment has a feed device 5, for example in the form of a belt conveyor by means of which carcass parts or carcasses to be clamped may be transported into the case clamp or clamped carcasses may be transported out of the case clamp. In this regard lower compression beam 1' in the present embodiment is integrated in feed device 5 which results in an especially compact and simple construction.

Although what is known as a through-feed clamp has been described above with reference to FIGS. 1 and 2, the invention is also applicable to other case clamp designs, such as joining clamps. Such clamps usually have holding elements for carcass parts which are not joined to other carcass parts until they are inside the case clamp itself. These holding elements are preferably traversable or pivotable and may likewise be fitted with at least one sonotrode in each case.

The invention claimed is:

1. A case clamp for clamping carcass parts to furniture carcasses comprising:
    a base frame,
    at least one pair of compression beams provided on the base frame, whereby at least one compression beam is traversable along the base frame in relation to the other compression beam, and
    at least one feed device to transport in carcass parts to be clamped and/or to transport out clamped carcasses, wherein
    the case clamp also has an ultrasonic welding device.

2. Case clamp according to claim 1, wherein the ultrasonic welding device has at least one sonotrode which is disposed in at least one of the compression beams.

3. Case clamp according to claim 2, wherein at least one sonotrode in each case is disposed in each compression beam of the at least one pair of compression beams.

4. Case clamp according to claim 2 or 3, wherein the sonotrodes are disposed in the compression beams such that they form at least a part of a pressure surface of the compression beams.

5. Case clamp according to claim 1, wherein the at least one compression beam provided with at least one sonotrode further has a booster and also a converter for the sonotrode.

6. Case clamp according to claim 1, including:
    at least two supports disposed on the base frame, of which at least one is traversable on the base frame,
    at least two pairs of horizontal compression beams disposed on the supports so as to be vertically traversable, and
    an upper compression beam disposed on the supports so as to be vertically traversable.

7. Case clamp according to claim 6, wherein in each case the supports are supported exclusively on the base frame in the vertical direction at least and are free at an opposing end.

8. Case clamp according to claim 6 or 7, wherein the supports are supported in each case by way of at least two guide elements on the base frame.

9. Case clamp according to claim 6, including a drive pillar for the upper compression beam, which comprises a drive.

10. Case clamp according to claim 9, including a counterweight which is integrated in the drive pillar and/or functions pneumatically.

11. Case clamp according to claim 1, including at least one holding element for carcass parts to be clamped.

12. Case clamp according to claim 11, wherein the at least one holding element has at least one sonotrode and a booster in addition to a converter for the sonotrode.

13. A process for clamping carcass parts to furniture carcasses, using a case clamp according to claim 1 with the following steps:
    providing carcass parts which are made up at least in part of timber, timber materials, or plastic,
    joining carcass parts into a furniture carcass using dowels, which dowels are made up at least in part of a thermoplastic material,
    transporting the joined carcass parts into the case clamp, and
    clamping the carcass parts with simultaneous application of ultrasonic vibrations to the dowels with the ultrasonic welding device.

14. Case clamp according to claim 3, wherein the at least one pair of compression beams is a pair of horizontal compression beams.

15. Case clamp according to claim 8, wherein the two guide elements are guide rails.

16. Case clamp according to claim 9, wherein the drive is a servo-drive.

17. Case clamp according to claim 11, wherein the holding element is traversable in relation to the base frame.

\* \* \* \* \*